United States Patent

[11] 3,577,777

| [72] | Inventors | Ray W. Whelan<br>Redwood City;<br>Edmond J. Atelian, San Carlos, Calif. |
|---|---|---|
| [21] | Appl. No. | 812,200 |
| [22] | Filed | Apr. 1, 1969 |
| [45] | Patented | May 4, 1971 |
| [73] | Assignee | Western Gear Corporation<br>Lynwood, Calif. |

[54] INERTIA SYSTEMS FOR DYNAMOMETERS
4 Claims, 3 Drawing Figs.

[52] U.S. Cl. .................................................. 73/133,
73/125, 74/572
[51] Int. Cl. ...................................................... G01l 5/28
[50] Field of Search ........................................... 73/118,
121, 125, 133, 134, 99; 74/572

[56] References Cited
UNITED STATES PATENTS

| 1,703,991 | 3/1929 | Day | 74/572 |
| 1,746,718 | 2/1930 | Smith | 73/125 |
| 1,801,927 | 4/1931 | Langbein | 73/125 |
| 2,093,042 | 9/1937 | Fottinger | 74/572UX |
| 2,914,962 | 12/1959 | Schmidt | 73/462X |
| 3,146,619 | 9/1964 | Sinclair et al. | 73/133X |
| 3,479,905 | 11/1969 | Helrigel | 74/572 |
| 3,491,587 | 1/1970 | Morris et al. | 73/134X |

FOREIGN PATENTS

| 1,107,399 | 3/1968 | Great Britain | 73/117 |

Primary Examiner—Charles A. Ruehl
Attorney—Gordon Wood

ABSTRACT: An inertia system for supplying a predetermined amount of energy through a rotating shaft to a dynamometer or like apparatus to permit testing various devices such as brakes. The system includes rotatably supported inertia elements on preferably two shafts connected together by a gear train to permit a substantially infinite variation of inertia and at the same time reduce the required strength of the torque transmitting gearing by employing a connecting gear train.

Patented May 4, 1971 3,577,777

INVENTOR.
RAY W. WHELAN
EDMOND J. ATELIAN.
BY
Gordon Wood

INERTIA SYSTEMS FOR DYNAMOMETERS

This invention relates to a system and mechanism for supplying kinetic energy in a predetermined amount to a dynamometer. More particularly the device is adapted for use in supplying kinetic energy from a rotating shaft to a test stand to permit the testing of various types of equipment such as brakes and to permit measuring and observing the reaction of such equipment to the imposition of various loads that might be encountered in actual use.

Heretofore, testing devices have been provided which include means for manually connecting inertia elements to a plate on a rotating shaft so that various combinations of speed and torque may be imparted to an output shaft on which the device to be tested such as a brake may be mounted. In such prior art devices difficulty has been experienced in providing the variability in the predetermined inertia which is required to perform the comprehensive tests required of automobile and aircraft manufacturers and others who supply equipment especially equipment wherein a high degree of safety is required. Usually the means for adding or subtracting inertia elements from the mechanism to provide a predetermined output energy has involved time consuming manual operations resulting in great expense and loss of time. In addition, such prior art devices have not been readily adjustable to provide a substantially infinite variation of the output inertia but the user has been required to be satisfied with stepped differences in inertia so that in some instances the exact required inertia has not been available.

The main object of the present invention is to improve inertia mechanisms available in the prior art.

Another object of the invention is the provision of a novel inertia mechanism which is adapted to provide a substantially infinite variation and energy output so as to permit its use in almost any test application.

Still another object of the invention is the provision of a novel inertia mechanism which is adapted to provide high outputs of energy with smaller parts than has heretofore been possible and at the same time simplify the design of such mechanism and reduce the loading on the various elements involved.

Yet another object of the invention is the provision of a substantially infinitely and variable inertia mechanism which requires considerably less room than that required by prior art mechanisms of like nature.

Another object of the invention is the provision of an inertia mechanism in which various inertia elements may be provided in such manner that many such elements may be connected and disconnected relative to their supporting shafts to obtain wide variation of energy with substantially no loss of time in converting from one energy output to another.

Other objects and advantages will be apparent from the following specification and from the drawings.

Figure 1:
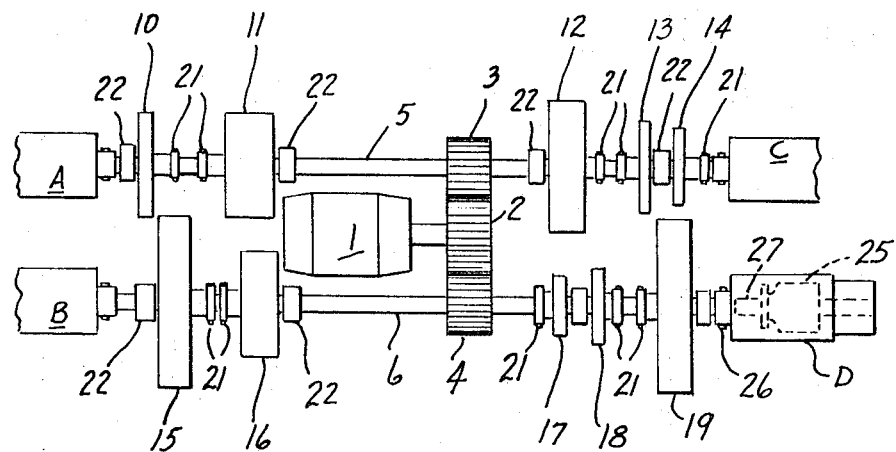
FIG. 1 is a greatly simplified schematic plan view of one form of the inertia mechanism connected to four test stands.

In detail, and first with reference with FIG. 1, the invention comprises a mechanism which is adapted, in this case, to be connected to any one of four different test stands. Such test stands are indicated at A, B, C and D.

The mechanism is driven by an electric motor 1, the output shaft of which carries a gear 2 which is in mesh at its opposite sides with gears 3 and 4 carried by parallel shafts 5 and 6 respectively. The shaft 5 is adapted to be connected at its ends with the test stations A and C and shaft 6 is adapted to be connected at its ends with test stations B and D. Each shaft 5, 6 is provided with a plurality of rotatably supported inertia elements and, in the particular example shown in FIG. 1, the inertia elements on shaft 5 are indicated at 10 through 14. Shaft 6 also carries five inertia elements designated 15 through 19.

Figure 2:
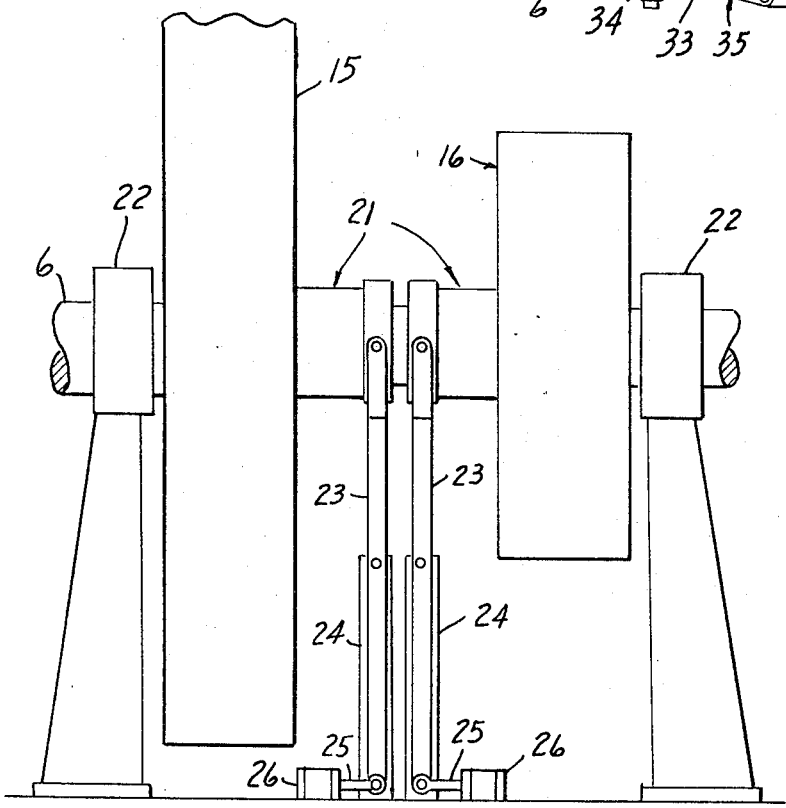
FIG. 2 is a greatly enlarged front elevational view of one shaft showing the typical method of supporting the shaft and the method of connecting and disconnecting the inertia elements therefrom.

It will be seen in FIG. 1 that each inertia element is provided with a clutch 21 which permits any combination of the above noted inertia elements to be fixedly but releasably connected to the shafts on which they are mounted. At spaced points along the length of the shafts there are provided conventional bearings 22 for rotatably supporting said shafts. In FIG. 2 a typical elevation in enlarged scale is shown which includes inertia elements 15, 16 and a pair of bearings 22. The clutches 21 may be operated in various ways but, as an example, in FIG. 2 there are shown a pair of vertically extending yoke members 23 pivotally connected at their upper ends to the clutches 21 and pivoted intermediate their ends to the upper ends of a pair of vertically extending standards 24. The yokes 23 are pivotally connected at their lower ends to the connecting rods 25 of a pair of hydraulic or pneumatic cylinders 26 which may be remotely controlled by methods that are well known. Upon extension of the connecting rods 25 the clutches 21 are moved axially on shaft 6 to interconnect said shaft with inertia elements 15, 16. It will be understood that the other inertia elements are connected and disconnected from the shafts in a similar manner.

As can be seen from FIG. 1, the energy developed in the system may be applied through either one of the rotating shafts 5, 6 to any one of the four test stands A through D. If, for example, it is desired to test the effect of a predetermined amount of energy on an automobile or aircraft brake such as indicated at 25 in test stand D it is merely necessary to connect the shaft 6 by means of clutch 25 with a shaft 27 on which the brake 25 is supported. It will be apparent that an extremely wide range of energy is available by connecting any one or any combination of the inertia elements 10 to 19. Furthermore, it will be seen that the loading on the gear teeth of gears 2, 3 and 4 is reduced over the loading which would be present if only one shaft were employed. In this connection it will also be apparent that three, four or more shafts surrounding electric motor 1 may be employed if desired with each having a gear meshing with the output gear 2 of the electric motor 1.

Figure 3:
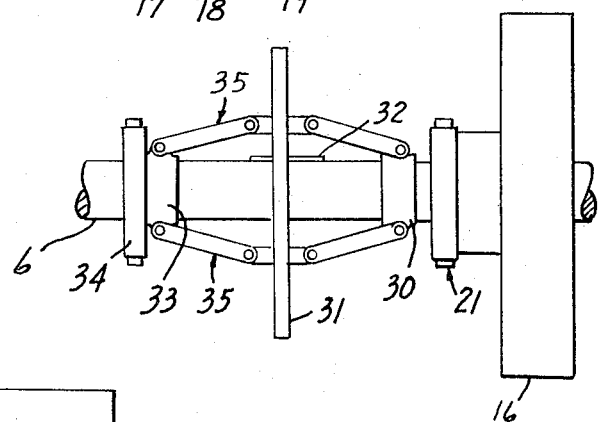
FIG. 3 is a fragmentary view showing a modified form of a portion of the mechanism of FIG. 1.

In FIG. 3 there is shown a modified form of the mechanism of FIG. 1 wherein the inertia element 15 is omitted and in its place a variable inertia element is provided. This variable inertia element is similar in its principle of operation to a flyball governor wherein the energy developed varies with the distance of the rotating mass from the axis of rotation. A sleeve 30 is fixedly secured to shaft 6 and an inertia element 31 in the form of a flywheel is keyed by key 32 to shaft 6 so as to permit axial movement of said flywheel on said shaft. On the other side of flywheel 31 from sleeve 30 is a slidable sleeve 33 connected to a yoke 34 which is similar in operation to the yokes 23 above described. A plurality of three-bar linkages 35 connect the sleeves 30, 33 with the flywheel 31 so as to permit the center links of the linkages to slide radially along flywheels 31 as the yoke 34 moves the slidable sleeve 33 along said shaft. By this structure it will be apparent that the effective inertia of the mechanism may be very closely adjusted to transfer an exact predetermined amount of energy at a given rotational speed to whatever one of the test stands is employed. Thus, although the elements 10 to 19 have a fixed predetermined inertial effect providing a stepped variation in total inertia the variable device of FIG. 3 when employed with the structure of FIG. 1 results in an infinitely variable inertia so that the exact amount of energy required can be supplied to the device to be tested.

In operation it will be seen that it is a relatively simple matter to connect any combination of inertia elements to the shafts 5, 6 and adjust the variable inertia device of FIG. 3 to obtain a total amount of mass which, related to a predetermined speed of rotation, results in the exact amount of energy required for the testing purpose. Motor 1 may then be driven at a speed greater than the speed of rotation desired and the entire system permitted to rotate with the motor 1 cut off. As the speed slows down the connection to the device to be tested such as the brake 25 may be made exactly when a tachometer (not shown) indicates that the speed is the predetermined speed desired.

We claim:

1. An inertia system adapted for use with a dynamometer in which energy is transmitted through a rotating shaft to a test stand,
   a pair of rotatably supported shafts,
   a gear train connecting said shafts for rotation of said shafts together,
   input power means for rotating said shafts through said gear train,
   means for connecting one of said shafts to a test stand,
   inertia elements associated with said shafts, and
   means for connecting and disconnecting at least one of said inertia elements relative to its shaft for varying the total inertia of the system.

2. A system according to claim 1 wherein said one inertia element is rotatably supported on its shaft and a clutch is provided for connecting and disconnecting said one element relative to its shaft.

3. A system according to claim 1 wherein one of said inertia elements includes a radially movable mass adapted to be selectively shifted to vary the energy thereof.

4. A system according to claim 1 wherein said means for connecting and disconnecting at least one of said inertia elements is a clutch.